US007771671B2

(12) United States Patent
Taylor et al.

(10) Patent No.: US 7,771,671 B2
(45) Date of Patent: Aug. 10, 2010

(54) AIR CONDITIONER DEVICE WITH PARTIALLY INSULATED COLLECTOR ELECTRODE

(75) Inventors: Charles E. Taylor, Punta Gorda, FL (US); Andrew J. Parker, Novato, CA (US); Igor Y. Botvinnik, Novato, CA (US); Shek Fai Lau, Foster City, CA (US); Gregory S. Synder, San Rafaél, CA (US); John Paul Reeves, Hong Kong (CN)

(73) Assignee: Sharper Image Acquisition LLC, New York, NY (US)

( * ) Notice: Subject to any disclaimer, the term of this patent is extended or adjusted under 35 U.S.C. 154(b) by 1141 days.

(21) Appl. No.: 11/338,974

(22) Filed: Jan. 25, 2006

(65) Prior Publication Data

US 2006/0203416 A1 Sep. 14, 2006

Related U.S. Application Data

(60) Provisional application No. 60/646,908, filed on Jan. 25, 2005, provisional application No. 60/646,956, filed on Jan. 25, 2005, provisional application No. 60/646,771, filed on Jan. 25, 2005, provisional application No. 60/646,876, filed on Jan. 25, 2005, provisional application No. 60/646,725, filed on Jan. 25, 2005.

(51) Int. Cl.
*B01J 19/08* (2006.01)

(52) U.S. Cl. ........................ 422/186.04; 422/121; 96/97

(58) Field of Classification Search ............ 422/186.04, 422/121; 96/97

See application file for complete search history.

(56) References Cited

U.S. PATENT DOCUMENTS

| | | | | |
|---|---|---|---|---|
| 4,643,745 | A * | 2/1987 | Sakakibara et al. | 96/76 |
| 6,350,417 | B1 * | 2/2002 | Lau et al. | 422/186.04 |
| 6,544,485 | B1 * | 4/2003 | Taylor | 422/186.04 |

OTHER PUBLICATIONS

An article published in http://www.desiredcreations.com/Misc_IonicBreeze.htm where the air purifier purchased in 2001 with the attached picture of the collector array.*

* cited by examiner

*Primary Examiner*—Kishor Mayekar
(74) *Attorney, Agent, or Firm*—Arent Fox LLP

(57) ABSTRACT

An air conditioning device comprises a substantially thin collector electrode capable of forming ions at a front and/or rear edge when charged. The thin collector electrode preferably having an insulating material disposed on the front and/or rear edge to prevent ions from being emitted therefrom. The collector electrode capable of being in the form of a thin elongated blade whereby an emitter electrode is upstream of the front edge or alternatively downstream of the front edge. The collector electrode alternatively in the form of a cylindrical structure or a porous grid having a plurality of air passageway cells therethrough.

20 Claims, 9 Drawing Sheets

AIR CONDITIONER DEVICE WITH PARTIALLY INSULATED COLLECTOR ELECTRODE

PRIORITY CLAIM

This application claims priority to and the benefit of U.S. patent application Ser. No. 60/646,908, filed Jan. 25, 2005; U.S. patent application Ser. No. 60/646,956, filed Jan. 25, 2005; U.S. patent application Ser. No. 60/646,771, filed Jan. 25, 2005; U.S. patent application Ser. No. 60/646,876, filed Jan. 25, 2005; and U.S. patent application Ser. No. 60/646,725, filed Jan. 25, 2005.

FIELD OF THE INVENTION

The present invention is related generally to a device for conditioning air.

CROSS-REFERENCE APPLICATIONS

U.S. Pat. No. 6,544,485, entitled "Electro-Kinetic Device with Anti Microorganism Capability";

U.S. Pat. No. 6,911,186, issued Jun. 28, 2005, and entitled "Electro-Kinetic Air Transporter-Conditioner Device with Enhanced Housing";

U.S. patent application Ser. No. 60/591,031, filed Jun. 26, 2004, entitled "Air Conditioner Devices Including Pin-Ring Electrode Configurations With Driver Electrode";

U.S. Pat. No. 7,638,104, issued Dec. 29, 2009, entitled "Air Conditioner Devices Including Pin-Ring Electrode Configurations With Driver Electrode";

U.S. Pat. No. 6,176,977, entitled "Electro-Kinetic Air Transporter-Conditioner";

U.S. Pat. No. 6,709,484, entitled "Electrode Self-Cleaning Mechanism For Electro-Kinetic Air Transporter Conditioner Devices;

U.S. patent application Ser. No. 10/074,207, filed Feb. 12, 2002, which is abandoned);

U.S. Patent Application No. 60/590,688, filed Jul. 23, 2004, entitled "Air Conditioner Device With Removable Driver Electrodes";

U.S. Pat. No. 6,984,987, issued Jan. 10, 2006, entitled "Electro-Kinetic Air Transporter And Conditioner Devices With Enhanced Arcing Detection And Suppression Features";

U.S. Patent Application Ser. No. 60/590,735, filed Jul. 23, 2004, entitled "Air Conditioner Device With Variable Voltage Controlled Trailing Electrodes";

U.S. Patent Application Ser. No. 60/590,960, filed Jul. 23, 2004, entitled "Air Conditioner Device With Individually Removable Driver Electrodes";

U.S. Patent Application Ser. No. 60/590,445, filed Jul. 23, 2004, entitled "Air Conditioner Device With Enhanced Germicidal Lamp";

U.S. patent application Ser. No. 11/004,397, filed Dec. 3, 2004, entitled "Enhanced Germicidal Lamp";

U.S. patent application Ser. No. 10/717,420, filed Nov. 19, 2003, which is abandoned);

U.S. Pat. No. 7,517,503, issued Apr. 14, 2009, entitled "Electro-Kinetic Air Transporter and Conditioner Devices including Pin-Ring Electrode Configurations with Driver Electrode";

U.S. Pat. No. 7,517,505, issued Apr. 14, 2009, entitled "Electro-Kinetic Air Transporter and Conditioner Devices with Insulated Driver Electrodes";

U.S. patent application Ser. No. 11/007,395, filed Dec. 3, 2004, entited "Air Conditioner Device With Removable Driver Electrode".

U.S. Pat. No. 7,291,207, issued Nov. 6, 2007, entitled "Air Conditioner Device With Removable Driver Electrodes";

U.S. patent application Ser. No. 11/003,894, filed Dec. 3, 2004, which is abandoned);

U.S. patent application Ser. No. 11/003,671 filed Dec. 3, 2004, which is abandoned);

U.S. patent application Ser. No. 11/006,344, filed Dec. 3, 2004, which is abandoned);

U.S. patent application Ser. No. 11/003,032, filed Dec. 3, 2004, which is abandoned);

U.S. patent application Ser. No. 11/003,516, filed Dec. 3, 2004, which is abandoned);

U.S. Provisional Application No. 60/646,725 filed Jan. 25, 2005, entitled "Electrostatic Precipitator With Insulated Driver Electrodes";

U.S. Provisional Application No. 60/646,876 filed Jan. 25, 2005, entitled "Air Conditioner Device With Ozone-reducing Agent Associated With An Electrode Assembly";

U.S. Provisional Application No. 60/646,956 filed Jan. 25, 2005, entitled "Air Conditioner Device With A Temperature Conditioning Device Having A Rechargeable Thermal Storage Mass";

U.S. Provisional Application No. 60/646,908 filed Jan. 25, 2005, entitled "Air Conditioner Device With A Temperature Conditioning Device Having A Thermoelectric Heat Exchanger"; and U.S. Pat. No. 7,077,890 issued Jul. 18, 2006, entitled "Electrostatic Precipitators With Insulated Driver Electrodes".

U.S. patent application Ser. No. 10/774,759 filed Feb. 9, 2004, entitled "Electrostatic Precipitators With Insulated Driver Electrodes".

BACKGROUND OF THE INVENTION

The use of an electric motor to rotate a fan blade to create an airflow has long been known in the art. Although such fans can produce substantial airflow (e.g., 1,000 $ft^3$/minute or more), substantial electrical power is required to operate the motor, and essentially no conditioning of the flowing air occurs.

It is known to provide such fans with a HEPA-compliant filter element to remove particulate matter larger than perhaps 0.3 μm. Unfortunately, the resistance to airflow presented by the filter element may require doubling the electric motor size to maintain a desired level of airflow. Further, HEPA-compliant filter elements are expensive, and can represent a substantial portion of the sale price of a HEPA-compliant filter-fan unit. While such filter-fan units can condition the air by removing large particles, particulate matter small enough to pass through the filter element is not removed, including bacteria, for example.

It is also known in the art to produce an airflow using electro-kinetic technique whereby electrical power is converted into a flow of air without utilizing mechanically moving components. One such system is described in U.S. Pat. No. 4,789,801 to Lee (1988), depicted herein in simplified form as FIGS. 1A and 1B, which is hereby incorporated by reference. System 10 includes an array of first ("emitter") electrodes or conductive surfaces 20 that are spaced-apart from an array of second ("collector") electrodes or conductive surfaces 30. The positive terminal of a generator such as, for example, pulse generator 40 which outputs a train of high voltage pulses (e.g., 0 to perhaps +5 KV) is coupled to the first array 20, and the negative pulse generator terminal is coupled to the second array 30 in this example.

The high voltage pulses ionize the air between the arrays 20,30 and create an airflow 50 from the first array 20 toward the second array 30, without requiring any moving parts. Particulate matter 60 entrained within the airflow 50 also moves towards the second electrodes 30. Much of the particulate matter is electrostatically attracted to the surfaces of the second electrodes 30, where it remains, thus conditioning the flow of air that is exiting the system 10. Further, the high voltage field present between the electrode sets releases ozone $O_3$, into the ambient environment, which eliminates odors that are entrained in the airflow.

In the particular embodiment of FIG. 1A, the first electrodes 20 are circular in cross-section, having a diameter of about 0.003" (0.08 mm), whereas the second electrodes 30 are substantially larger in area and define a "teardrop" shape in cross-section. The ratio of cross-sectional radii of curvature between the bulbous front nose of the second electrode 30 and the first electrodes 20 exceeds 10:1. As shown in FIG. 1A, the bulbous front surfaces of the second electrodes 30 face the first electrodes 20, and the somewhat "sharp" trailing edges face the exit direction of the airflow. In another particular embodiment shown herein as FIG. 1B, second electrodes 30 are elongated in cross-section. The elongated trailing edges on the second electrodes 30 provide increased area upon which particulate matter 60 entrained in the airflow can attach.

DETAILED DESCRIPTION OF THE PRESENT INVENTION

Figure 1A:
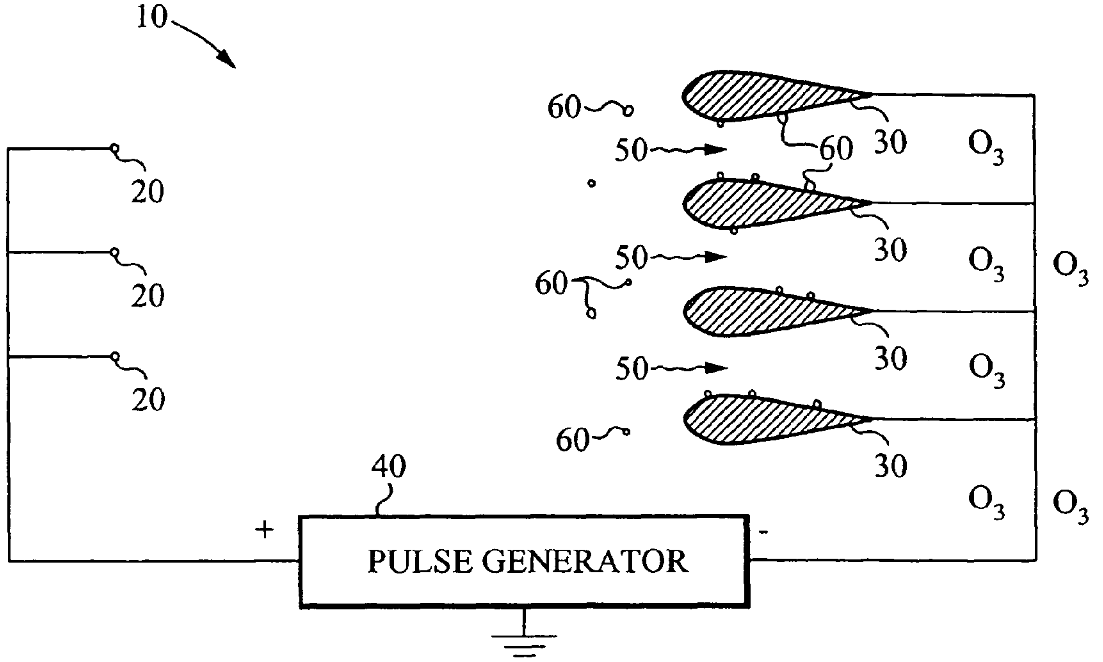
Fig. 1A (PRIOR ART)
FIG. 1A illustrates a plan, cross-sectional view, of a prior art electro-kinetic air transporter-conditioner system.
Figure 1B:
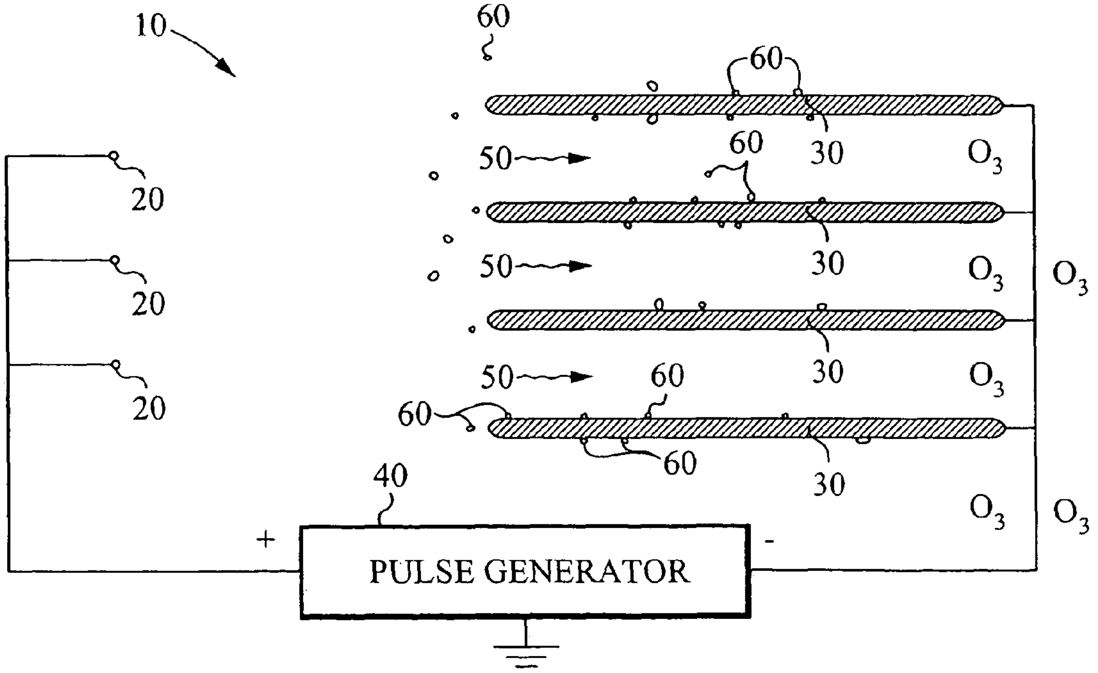
Fig. 1B (PRIOR ART)
FIG. 1B illustrates a plan, cross-sectional view of a prior art electro-kinetic air transporter-conditioner system.
Figure 2:
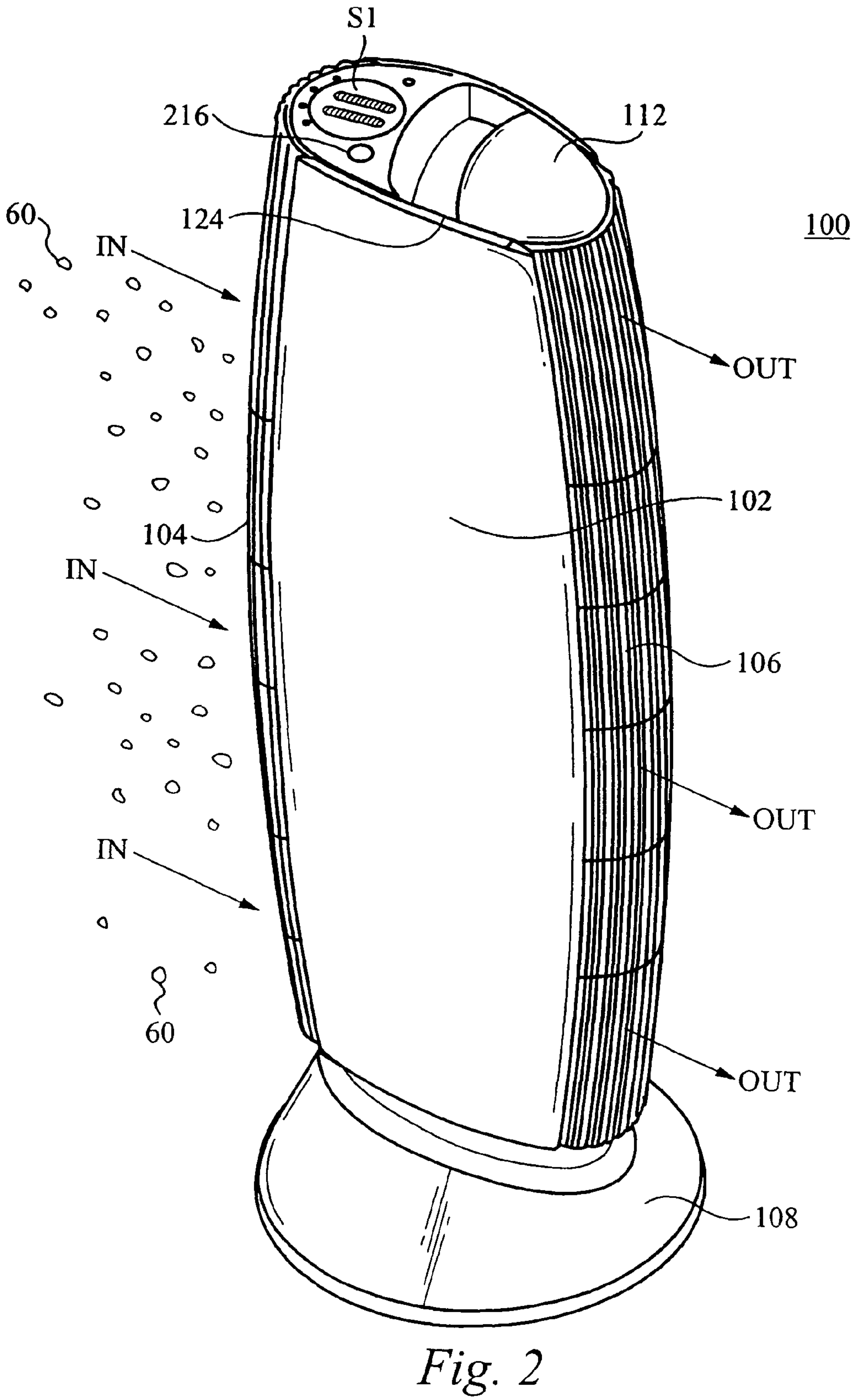
FIG. 2 illustrates a perspective view of the device in accordance with one embodiment of the present invention.

FIG. 2 depicts one embodiment of the air conditioner system 100 which has elongated housing 102 that includes a top, a bottom and side walls that extend between the top and bottom. The system 100 preferably includes a removable rear-located inlet grill 104, a removable front-located outlet grill 106, and a base pedestal 108. It is preferred that the inlet and the outlet grills 104, 106 are on opposing sides from each other, as shown in FIG. 2. Alternatively, a single grill provides both an air intake and an air exhaust with an air inlet channel and an air exhaust channel communicating with the single grill and the air movement system within. The housing 102 is preferably freestanding and/or upstandingly vertical and/or elongated. Internal to the housing 102 is an ion generating electrode assembly 320 (FIG. 3) which is preferably powered by an AC:DC power supply that is energizable or excitable using switch S1. S1 is conveniently located at the top 124 of the housing 102. Located preferably on top of the housing 102 is a boost button 216 which can boost the ion output of the system, as will be discussed below. The ion generating unit 320 is self-contained in that, other than ambient air, nothing is required from beyond the transporter housing, save external operating potential, for operation of the present invention. In one embodiment, a fan 550 (FIG. 5) is utilized to supplement and/or replace the movement of air caused by the operation of the emitter and collector electrodes, as described below. In one embodiment, the system 100 includes a germicidal lamp 750 (FIG. 5) within which reduces the amount of microorganisms exposed to the lamp when passed through the system 100.

The general shape of the housing 102 in the embodiment shown in FIG. 2 is that of an oval cross-section. Alternatively, the housing 102 includes a differently shaped cross-section such as, but not limited to, a rectangular shape, a figure-eight shape, an egg shape, a tear-drop shape, or circular shape. As will become apparent later, the housing 102 is shaped to contain the air movement system. In one embodiment, the air movement system is an electrode assembly 320 (FIG. 3), as discussed below. Alternatively, or additionally, the air movement system is a fan or other appropriate mechanism. The housing 102 is preferably a freestanding unit which can be placed to stand alone in a room to clean the air in the room.

Both the inlet and the outlet grills 104, 106 are covered by fins or louvers. In accordance with one embodiment, each fin is a thin ridge which is spaced-apart from the next fin, so that each fin creates minimal resistance as air flows through the housing 102. As shown in FIG. 2, the fins are vertical and are directed along the elongated vertical upstanding housing 102 of the system 100, in one embodiment. Alternatively, the fins are perpendicular to the elongated housing 102 and are configured horizontally. In one embodiment, the inlet and outlet fins are aligned to give the unit a "see through" appearance. Thus, a user can "see through" the system 100 from the inlet to the outlet or vice versa. The user will see no moving parts within the housing, but just a quiet unit that cleans the air passing therethrough. There is preferably no distinction between grills 104 and 106, except their location relative to the collector electrodes 342. Alternatively, the grills 104 and 106 are configured differently and are distinct from one another. The grills 104, 106 serve to ensure that an adequate flow of air is drawn into or made available to the system 100 and that an adequate flow of ionized air that includes appropriate amounts of ozone flows out from the system 100 via the outlet grill 106.

When the system 100 is energized by activating switch S1, high voltage or high potential output by the ion generator produces at least ions within the system 100. The "IN" notation in FIG. 2 denotes the intake of ambient air with particulate matter 60 through the inlet grill 104. The "OUT" notation in FIG. 2 denotes the outflow of cleaned air through the outlet grill 106 which is substantially devoid of the particulate matter 60. It is desired to provide the inner surface of the housing 102 with an electrostatic shield to reduce detectable electromagnetic radiation. For example, a metal shield is disposed within the housing 102, or portions or all of the interior of the housing 102 is alternatively coated with a metallic paint to reduce such radiation.

Figure 3:
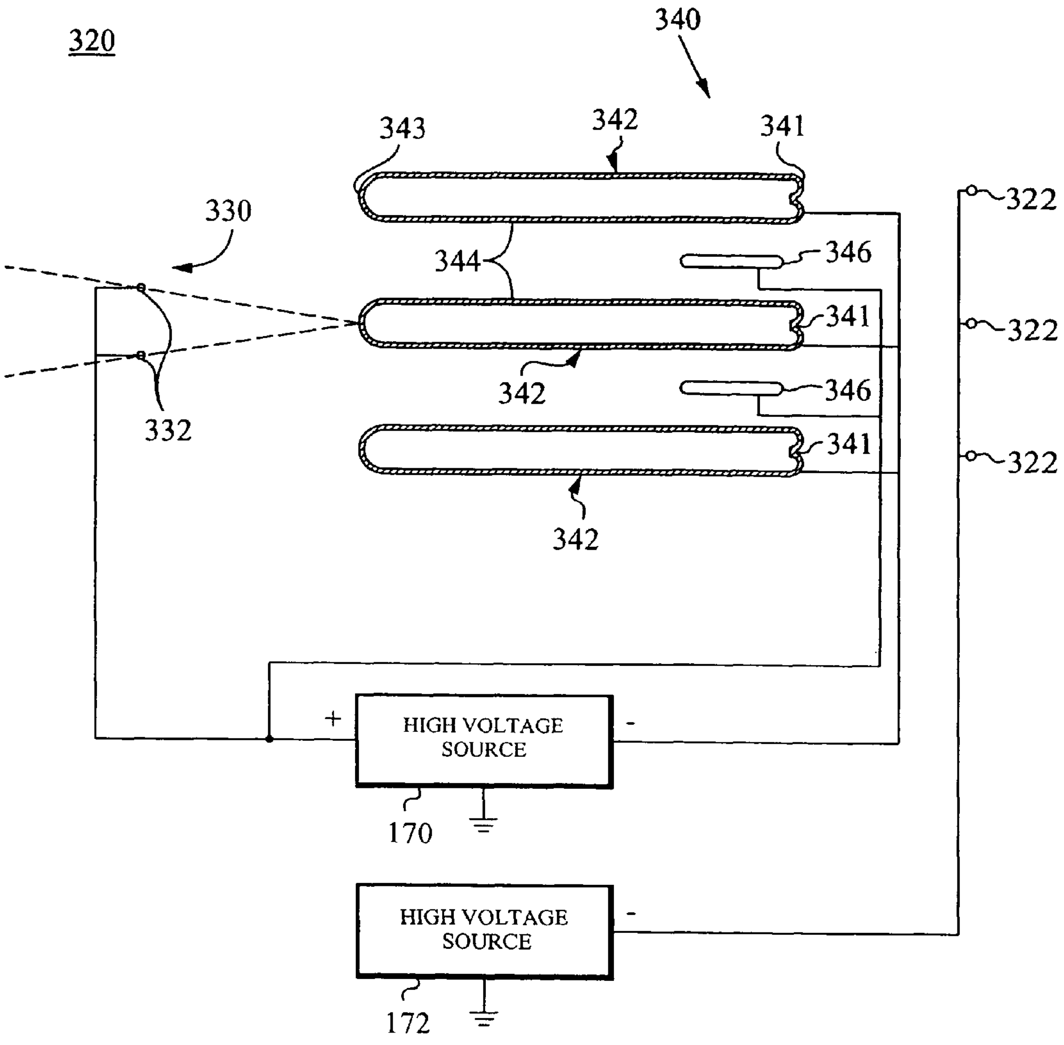
FIG. 3 illustrates a plan view of an electrode assembly in accordance with one embodiment of the present invention.

FIG. 3 illustrates a plan view of one embodiment of the electrode assembly 320 in accordance with one embodiment of the present invention. As shown in FIG. 3, the electrode assembly 320 comprises a first set 330 of at least one emitter electrode 332 and a second set 340 of at least one collector electrode 342. FIG. 3 shows two emitter electrodes 332, three collector electrodes 342, two driver electrodes 346, and three trailing electrodes 322, although any other number of electrodes are contemplated. It is preferred that the number N1 of emitter electrodes 332 in the first set 330 differ by one relative to the number N2 of collector electrodes 342 in the second set 340. Preferably, the system includes a greater number of collector electrodes 342 than emitter electrodes 332. However, if desired, additional emitter electrodes 332 are alternatively positioned at the outer ends of the first set 330 such that N1>N2 (e.g., four emitter electrodes 332 compared to three collector electrodes 342).

Figure 6:
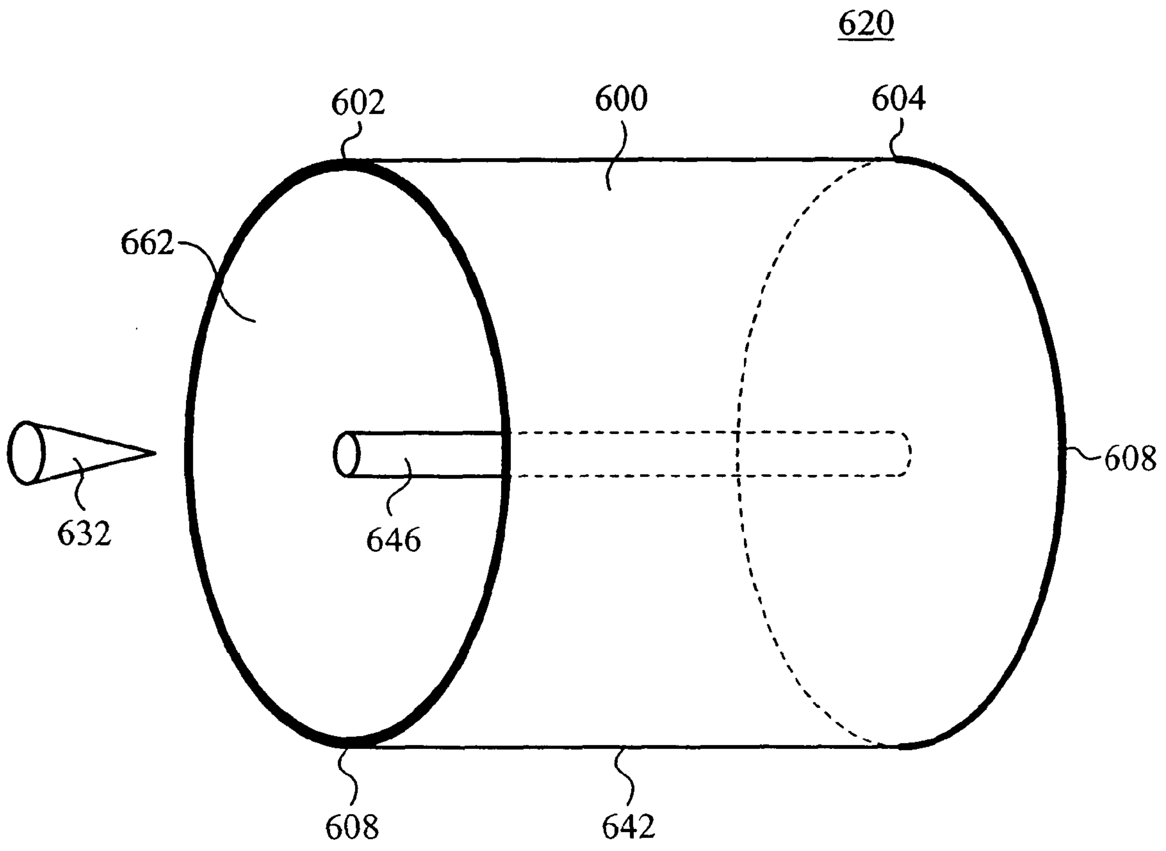
FIG. 6 illustrates a plan view of the pin-ring electrode assembly with partially insulated collector electrode in accordance with one embodiment of the present invention.

As shown in FIG. 3, the emitter electrodes are preferably wire-shaped and extend lengthwise within the elongated housing. The terms "wire" and "wire-shaped" shall be used interchangeably herein to mean an electrode either made from a wire or another component that is thicker and/or stiffer than a wire. In other embodiments, the emitter electrode is configured as pin or needle shaped electrode which are used in place of a wire, as shown in FIG. 6. For example, an elongated saw-toothed edged emitter electrode can be used, with each tooth functioning as a corona discharge point. A column of tapered pins or needles would function similarly. In another embodiment, a plate with a single or plurality of sharp downstream edges can be used as an emitter electrode. These are just a few examples of the emitter electrodes that can be used with embodiments of the present invention.

In addition, as shown in FIG. 3, the collector electrodes 342 are configured to define side regions 344, an end 341 and a front bulbous region 343. The collector electrodes 342 in FIG. 3 are plate-shaped and elongated. In one embodiment, the collector electrodes 342 are equidistant from one another and the emitter electrodes 332. Alternatively, the collector electrodes 342 are not equidistant from the emitter electrodes 332.

The material(s) of the electrodes 332 and 342 should conduct electricity and be preferably resistant to the corrosive effects from the application of high voltage, but yet strong and durable enough to be cleaned periodically. In one embodiment, the emitter electrodes 332 in the first electrode set 330 are fabricated from tungsten. Tungsten is sufficiently robust in order to withstand cleaning, has a high melting point to retard breakdown due to ionization, and has a rough exterior surface that promotes efficient ionization. The collector electrodes 342 preferably have a highly polished exterior surface and smooth corners to minimize unwanted point-to-point ion discharge. As such, the collector electrodes 342 are fabricated from stainless steel and/or brass, among other appropriate materials. The polished surface of electrodes 342 also promotes ease of electrode cleaning. The materials and construction of the electrodes 332, 342, allow the electrodes 332, 342 to be lightweight, relatively easy to fabricate, and lend themselves to mass production. Further, electrodes 332, 342 described herein promote more efficient generation of ionized air, and appropriate amounts of ozone.

As shown in FIG. 3, one embodiment of the present invention includes a first high voltage source (HVS) 170 and a second high power voltage source 172. The positive output terminal of the first HVS 170 is coupled to the emitter electrodes 332 in the first electrode set 330, and the negative output terminal of the first HVS 170 is coupled to collector electrodes 342. With this arrangement, the net polarity of the emitted ions is positive (e.g., more positive ions than negative ions are emitted). This coupling polarity has been found to work well and minimizes unwanted audible electrode vibration or hum. However, while generation of positive ions is conducive to a relatively silent airflow, from a health standpoint, it may be desired that the output airflow be richer in negative ions than positive ions. It is noted that in some embodiments, one port, such as the negative port, of the high voltage power supply can in fact be the ambient air. Thus, the collector electrodes 342 need not be connected to the HVS 170 using a wire. Nonetheless, there will be an "effective connection" between the collector electrodes 342 and one output port of the HVS 170, in this instance, via ambient air. Alternatively the negative output terminal of HVS 170 is connected to the first electrode set 330 and the positive output terminal is connected to the second electrode set 340.

When voltage or pulses from the HVS 170 are generated across the first and second electrode sets 330 and 340, a plasma-like corona discharge field is created surrounding the emitter electrodes 332. This electric field ionizes the ambient air between the first and the second electrode sets 330, 340 and establishes an "OUT" airflow that moves towards the second electrodes 340. It is understood that the IN flow preferably enters the device 100 via grill(s) 104 and that the OUT flow exits via grill(s) 106 as shown in FIG. 2.

Ozone and ions a regenerated simultaneously by the emitter electrodes 332 as a function of the voltage potential from the HVS 170. Ozone generation is increased or decreased by respectively increasing or decreasing the voltage potential between the first set of electrodes 320 and the second set of electrodes 340. As the ions and ionized particulates move toward the second set 340, the ions and ionized particles push or move air molecules toward the collector electrodes 342, thereby causing the air to flow. The relative velocity of this motion is increased, by way of example, by increasing the voltage potential at the second set 340 relative to the potential at the first set 330.

As shown in FIG. 3, at least one output trailing electrode 322 is included in the electrode assembly 320. Alternatively, the device 100 does not utilize the trailing electrodes 322. The trailing electrode 322 generates a substantial amount of negative ions, because the electrode 322 is coupled to relatively negative high potential. In one embodiment, the trailing electrode(s) 322 is a wire positioned downstream from the collector electrodes 342. In one embodiment, the electrode 322 has a pointed shape in the side profile, e.g., a triangle. Alternatively, at least a portion of the trailing edge in the collector electrode 342 has a pointed electrode region which emits the supplemental negative ions, as described in U.S. Pat. No. 6,911,186, which is incorporated by reference above.

The negative ions produced by the trailing electrode 322 neutralize excess positive ions otherwise present in the output airflow, such that the OUT flow has a net negative charge. The trailing electrodes 322 are preferably made of stainless steel, copper, or other conductor material. Although three trailing electrodes are shown in FIG. 3, any number of trailing electrodes are contemplated. The inclusion of one electrode 322 has been found sufficient to provide a sufficient number of output negative ions.

The trailing electrodes 322 are electrically coupled to the negative terminal of a second high-voltage source (HVS) 172 in one embodiment. The trailing electrodes 322 are alternatively electrically coupled to the negative terminal of the first HVS 170. The positively charged particles within the airflow can be attracted to and collect on the trailing electrodes 322. Thus, the trailing electrodes 322 can also serve as a second surface area to collect the positively charged particles, as well as emit negative ions into the existing airflow. More details regarding the trailing electrodes are provided in U.S. patent application Ser. No. 11/003,671, which is incorporated by reference and has been abandoned. In a typical electrode assembly with no trailing electrode 322, most of the particles will collect on the surface area of the collector electrodes 342. However, some particles will pass through the system 100 without being collected.

In the embodiment shown in FIG. 3, the electrode assembly 320 also includes driver electrodes 346 located interstitially between the collector electrodes 342. In one embodiment, the driver electrodes 346 each have an underlying electrically conductive electrode provided on a printed circuit board substrate material that is insulated by a dielectric material, including, but not limited to insulating varnish, lacquer, resin, ceramic, porcelain enamel, a heat shrink polymer (such as, for example, a polyolefin) or fiberglass. In another embodiment, the driver electrodes 346 are not insulated.

In one embodiment, the driver electrodes 346 as well as the emitter electrodes 332 are positively charged, whereas the collector electrodes 342 are negatively charged as shown in FIG. 3. In particular, the driver electrodes 346 are electrically coupled to the positive terminal of either the first or second HVS 170, 172. As stated above, the emitter electrodes 332 apply a positive charge to particulates passing by the emitter electrodes 332. The electric fields which are produced between the driver electrodes 346 and the collector electrodes 342 will thus repel and push the positively charged particles toward the collector electrodes 342. Generally, the greater this electric field between the driver electrodes 346 and the collector electrodes 342, the greater the migration velocity and the particle collection efficiency of the electrode assembly 320.

In another embodiment, the driver electrodes 346 are electrically connected to ground. Although the grounded drivers 346 do not receive a charge from the first or second HVS 170, 172, the driver electrodes 346 may still deflect positively charged particles toward the collector electrodes 342. In another embodiment, the driver electrodes 346 are electrically coupled to the negative terminal of either the first or second HVS 170, 172, whereby the driver electrodes 346 are preferably charged at a voltage that is less negative than the negatively charged collector electrodes 342. More details regarding the insulated driver electrodes 346 are described in the U.S. patent application Ser. No. 10/717,420, now abandoned, which is incorporated by reference above.

Figure 4:
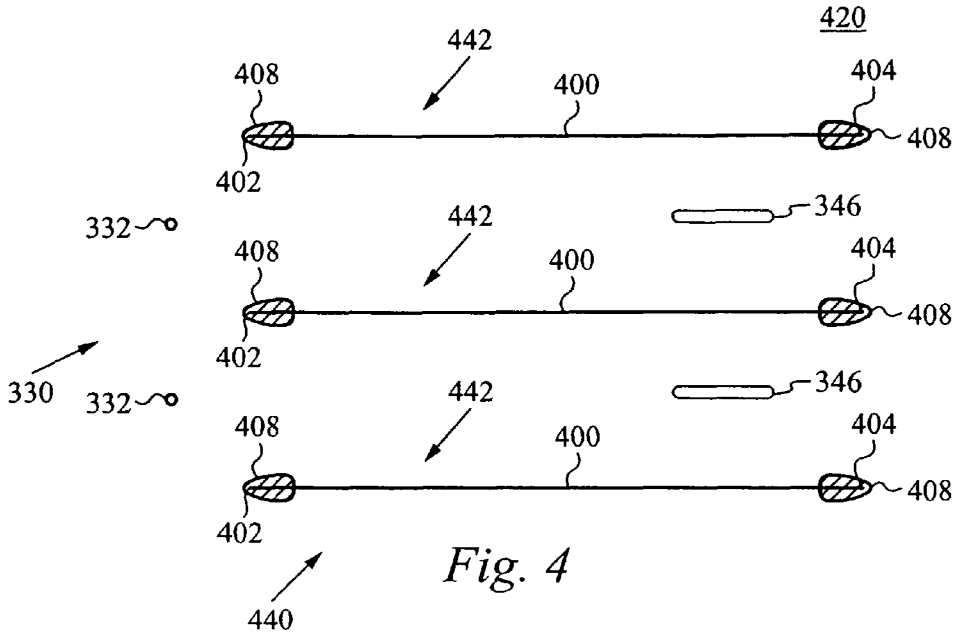
FIG. 4 illustrates a plan view of an electrode assembly with partially insulated collector electrodes in accordance with one embodiment of the present invention.

FIG. 4 illustrates a plan view of an electrode assembly in accordance with one embodiment of the present invention. As shown in FIG. 4, the electrode assembly 420 includes one or more emitter electrodes 332, one or more thin, plate-like, collector electrodes 442 downstream of the emitter electrodes 332 and one or more driver electrodes 346 positioned between adjacent collector electrodes 442. Preferably, the driver electrodes 346 are insulated with the same insulating material that is described below with respect to the collector electrodes. The driver electrodes 346 do not necessarily need to be included in the electrode assembly 420. Although not shown, the electrode assembly 420 can also include trailing electrodes discussed above. As opposed to the hollow collector electrodes 342 shown in FIG. 3, each collector electrode 442 in FIG. 4 preferably includes a substantially thin conductive body 400. The thin collector electrode 442 is also referred to herein as a collector blade.

The thin collector electrode 442 preferably comprises a collector body 400 made of a relative thin sheet of conductive material which has a front edge 402 and a rear edge 404. The thin collector blade 442 has advantages over the hollow collector electrode 342 in FIG. 3. The relatively smaller thickness of the collector body 400 decreases the amount of airflow restriction caused by the collector electrode 442 since the body 400 has a smaller surface area at the front and rear edges 402, 404. In addition, the smaller thickness of the collector blades 442 allow more collector electrodes 442 than conventional collector electrodes 342 to be placed in a given amount of space. In one embodiment, the collector blade 442 is positioned 5-20 millimeters from the adjacent driver electrode 346. In one embodiment, the collector blade 442 is positioned 10-30 millimeters from the neighboring collector electrode 442. These dimensions are preferred and are therefore not limiting. This provides the potential to increase airflow velocity and collection efficiency by being able to place more collector blades in the housing 102 without substantially restricting airflow therein. Moreover, the thin collector blade 442 may be simpler and less expensive to manufacture than the stamped or pressed hollow collector electrode 342. In addition, the simpler geometry and manufacturing attributes of the thin collector electrode 442 allow for easier scalability of the electrode 442 in different-sized volume housings.

However, the small thickness of the collector blades 442 can render the body 400 to have sharp front and rear edges 402, 404. Sharp edges of a conductive body tend to emit ions when the conductive body is charged. To maintain the electrical fields between the emitter electrodes 332 and the collector electrodes 442, and to maintain the desired airflow in the downstream direction, it is desirable that the collector electrodes 442 do not emit ions at the front and/or rear edges 402, 404. To prevent ions from forming on the edges 402, 404, an insulating material, and preferably a dielectric insulating material, is applied to the at least one of the front and rear edges 402, 404. The insulating material 408 thereby covers the conductive edges 402, 404 of the collector electrodes 442 to prevent ions from emitting therefrom. The remaining exterior surface of the partially insulated collector blade 442 is exposed so that the collector blade 442 can effectively collect charged particulates traveling in the air as well as generate the desired electrical field. In one embodiment, the insulation 408 disposed at the edges 402, 404 may cause the electrode 442 to have a substantially larger surface area at the edges 402, 404 as opposed to if the edges 402, 404 were not insulated. In another embodiment, the insulation 408 applied to the edges 402, 404 is not substantially thicker than the thickness of the body 400. In one embodiment, only the front edges 402 of the collector blades 442 are insulated, whereas the rear edges 404 are uninsulated. This configuration prevents the front edge 402 from emitting ions while the rear edges 404 are allowed to emit ions in the airflow. For example, negatively charged collector blades 442 having uninsulated rear edges 404 can produce negative "feel good" ions alternatively, or in addition to, the trailing electrodes described herein.

In one embodiment of the present invention, the dielectric insulating material 408 has heat shrinking characteristics in which the material 408 is placed over the edges of the collector blade body 400 and then heated. Upon being heated, the dielectric material 408 shrinks to the contour the shape of the collector blade edge 402, 404. An exemplary heat shrinkable tubing is type FP-301 flexible polyolefin material available from 3M of St. Paul, Minn.

In accordance with another embodiment of the present invention, the dielectric material 336 is an insulating varnish, lacquer or resin. For example, a varnish, after being applied to the edges 402, 404 of the collector blade body 400, can be dried to form an insulating coat or film of a few mil (thousands of an inch) in thickness, thereby covering the edges 402, 404. The dielectric strength of the varnish or lacquer can be, for example, above 1000 V/mil (one thousands of an inch). Such insulating varnishes, lacquer and resins are commercially available from various sources, such as from John C. Dolph Company of Monmouth Junction, N.J., and Ranbar Electrical Materials Inc. of Manor, Pa. Other possible dielectric materials that can be used to insulate the edges of the collector blades 442 include, but are not limited to, ceramic or porcelain enamel or fiberglass. It is within the spirit and scope of the present invention that other insulating dielectric materials can be used to insulate the driver electrodes. Preferably, the driver electrodes 546 are insulated with the same insulating material that is described herein with respect to the collector electrodes.

Figure 5:
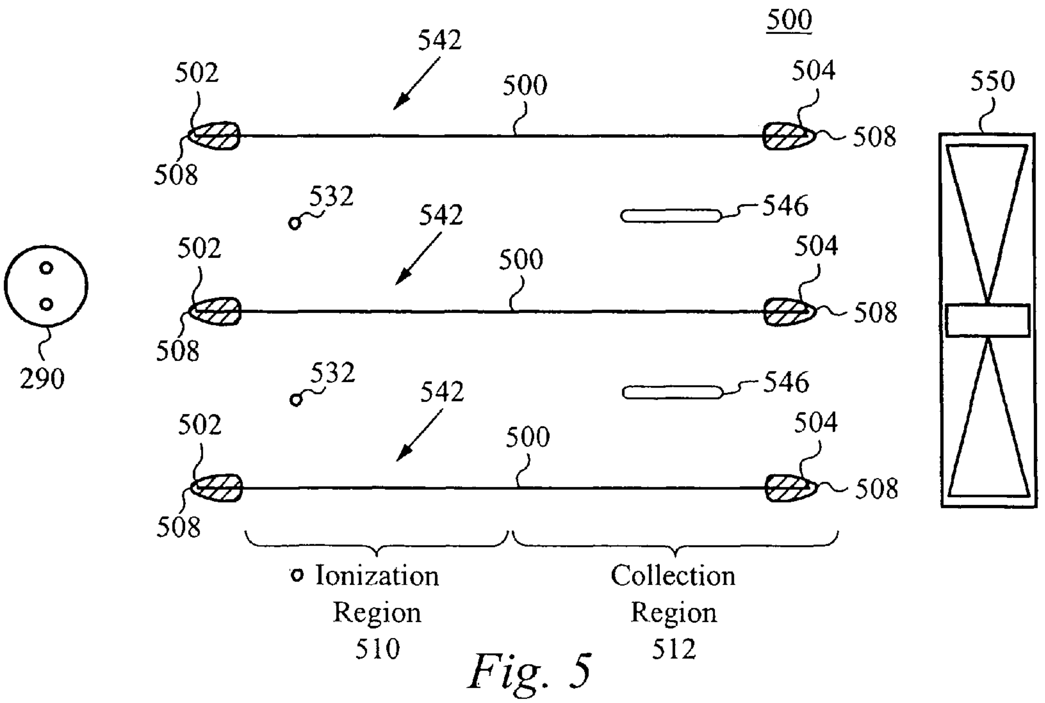
FIG. 5 illustrates a plan view of an electrostatic precipitator electrode assembly with partially insulated collector electrodes in accordance with one embodiment of the present invention.

FIG. 5 illustrates an electrode assembly 520 of an electrostatic precipitator (ESP) system according to one embodiment of the present invention. The electrode assembly 520 preferably includes one or more emitter electrodes 532, and one or more collector electrodes 542 positioned downstream of the emitter electrodes 532. At least one driver electrode 546 may be positioned interstitially between a pair of adjacent collector electrodes 542, although not necessarily. In one embodiment, as shown in FIG. 5, the system 500 includes a germicidal (e.g., ultra-violet) lamp 290 located upstream of the electrodes to destroy germs within the airflow. Alternatively, or additionally, the lamp 290 is located downstream of the electrodes. It should be noted that any of the embodiments can be modified to include the lamp 290. More details of the germicidal lamp are described in U.S. Pat. No. 6,911,186, and U.S. patent application Ser. No. 60/590,445, and U.S. patent application Ser. No. 11/004,397, all of which are incorporated by reference. In the embodiment shown in FIG. 5, the system 520 also includes one or more fans 550 preferably downstream of the electrodes. The fans 550 can be located elsewhere with respect to the electrode assembly 520.

As shown in FIG. 5, the emitter electrodes 532 are preferably positioned downstream of the front edge 502 of the collector electrodes 542. The emitter electrodes 532 are positioned as such to create a strong ionization region. Air preferably flows through the electrode assembly 520 of the ESP system in a downstream direction from the leading edge 502 of the collector electrodes 542 to the trailing edge 504 of the collector electrodes 542. In one embodiment, the airflow can be created with forced air circulation, such as one or more fans 550 upstream of the electrode assembly 220 to push the air to the electrode assembly 220. However, in another embodiment, as shown in FIG. 5, one or more fans 550 are located downstream of the electrode assembly 200 to pull the air through the electrode assembly 520. The airflow may also be generated by the electrode assembly 520 itself. These examples are not meant to be limiting. More details regarding the electrostatic precipitator are discussed in U.S. Pat. No. 7,077,890 and U.S. Provisional Application 60/646,725, both of which are incorporated by reference.

As shown in the embodiment in FIG. 5, the collector electrodes 542 in the electrostatic precipitator assembly 520 have a small thickness dimension as such with the collector electrodes 442 in FIG. 4. As with the collector blades 442 in FIG. 4, the thin collector blades 542 in FIG. 5 have a collector blade body 500 with the front edge 502 and the rear edge 504 coated with the insulating material 508, and preferably a dielectric insulating material. The insulating material 508 prevents ions from forming at the front and rear edges 502, 504 of the collector electrodes 542 to maintain the strength of the ionization region 510 as well as the collection region 512. As stated above, utilizing thin collector blades 542 can, among other things, significantly reduce airflow restriction, allow manufacturing of the collector electrodes 542 to be simpler and less expensive, and provide ease of scalability. Details regarding the insulating material 508 are discussed above. Alternatively as described above with respect to the embodiment of FIG. 4, only the front edge 502 of the collective electrodes is insulated.

FIG. 6 illustrates a perspective view of a pin-ring electrode assembly configuration in accordance with one embodiment of the present invention. The electrode assembly 620 preferably includes one or more pin emitter electrodes 632, one or more ring collector electrodes 642 and one or more driver electrode 646 located within (or at least partially within) an interior 662 of the ring collector electrode 642. The driver electrode is preferably insulated. In another embodiment, the electrode assembly does not include the driver electrode 646. In one embodiment, the electrode assembly 620 utilizes one or more trailing electrodes downstream of the collector electrodes 646. It should be noted that the configuration in FIG. 6 is only one example, and other configurations are contemplated within the scope of the present invention. Further description of other configurations are discussed in U.S. Pat. No. 7,638,104, which is incorporated by reference.

In the embodiment shown in FIG. 6, the collector electrode 642 is made of a substantially thin conductive material. The body 600 of the collector electrode 642 is a substantially thin conductive sheet and has a front edge 602 as well as a rear edge 604. As stated above, utilizing a thin collector ring 642 can, among other things, significantly reduce airflow restriction, allow manufacturing of the collector electrodes 642 to be simpler and less expensive, and provide ease of scalability. Additionally, the thinner collector ring 642 is sufficiently robust to handle the required voltage to produce the desired electrical field strength as well as provide the desired collection efficiency. As described above, the edges of the substantially thin collector electrode body 600 can emit ions when the collector electrode 642 is charged with a voltage, thereby altering the electric field between the individual electrodes in the assembly. To prevent ions from being emitted from the front and/or rear edges 602, 604, dielectric insulation material 608 is applied to the front and rear circular edges 602, 604. The remaining portion of the collector electrode 642 remains uninsulated to produce the desired electrical field as well as provide the desired collection efficiency. Alternatively, only the front edge 602 of the collector electrode is insulated, as stated above.

Figure 7A:
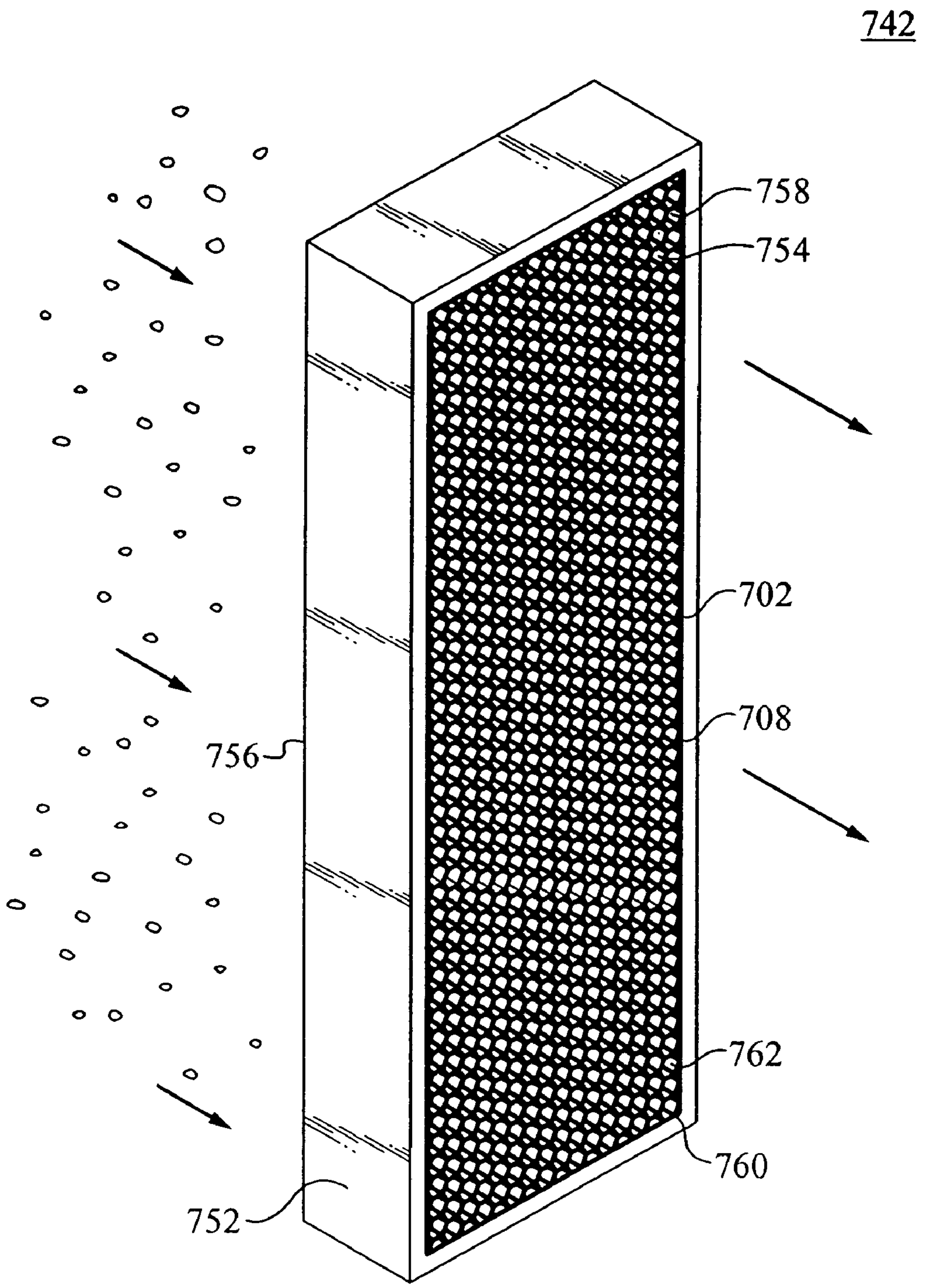
FIG. 7A illustrates a perspective view of a partially insulated collecting electrode grid in accordance with one embodiment of the present invention.

FIG. 7A illustrates a perspective view of an alternative collector electrode in accordance with the present invention. As shown in FIG. 7A, the collector electrode 742 includes an outer frame 752 which surrounds a porous conductive grid 754. The porous grid 754 preferably extends from an inlet side 756 to an outlet side 758 of the frame 752. The grid comprises an array of conductive surfaces 762 arranged in a pattern to form several air passageways 760. In one embodiment, the conductive surfaces 762 shown in FIG. 7A are arranged to form multiple hexagonal air passageways, also termed generally as a “honeycomb” structure, which extend from the inlet side 756 to the outlet side 758. The air passageways accelerate the velocity of the airflow and collects particulates in the airflow. Further details regarding the structure 742 are described in U.S. Provisional Application No. 60/646,876, which is incorporated by reference.

In one embodiment, the conductive surfaces 362 are coated with a catalyst material, whereby the catalyst material acts to reduce or neutralize ozone in the airflow. As ozone passes through each cell 360, the catalyst substance on the conductive surfaces 362 converts the ozone into the oxygen, thereby reducing the amount of ozone exiting the electrode 342. Thus, the catalyst coated cells 360 in the grid 354 will thereby significantly reduce the amount of ozone exiting the device 100. It should be noted that the catalyst material can also be applied to the driver and/or collector electrode blades discussed in the above embodiments. Details of the catalyst material are discussed in U.S. Provisional Application No. 60/646,876 incorporated by reference.

The conductive surfaces 762 of the grid 754 are preferably made of a series of metal sheets which are attached to form the air passageways 760. As stated above, sharp edges of the conductive surface can produce ions when a current and voltage is applied to the conductive surface. Thus, the conductive surfaces 762 are smooth and uniform to prevent ions from forming along the conductive surfaces 762 when a current is applied thereto. Insulating material, and preferably dielectric insulating material, as noted above, is preferably applied to the front and rear edges 702, 704 of the conductive surfaces 762 to prevent ions from being emitted by the collector electrode 742. Alternatively, the insulating material is applied to only the front edge of the conductive surfaces 762. The remaining portion of the collector grid 754 remains uninsulated to produce the desired electrical field as well as provide the desired collection efficiency. As stated above, utilizing a thin conductive sheets of the collector grid 754 can, among other things, significantly reduce airflow restriction, allow manufacturing of the collector grid 754 to be simpler and less expensive, and provide ease of scalability. Additionally, the thinner conductive sheets 762 of the collector grid 754 are sufficiently robust to handle the required voltage to produce the desired electrical field strength as well as provide the desired collection efficiency as that of thicker collector electrodes.

Figure 7B:
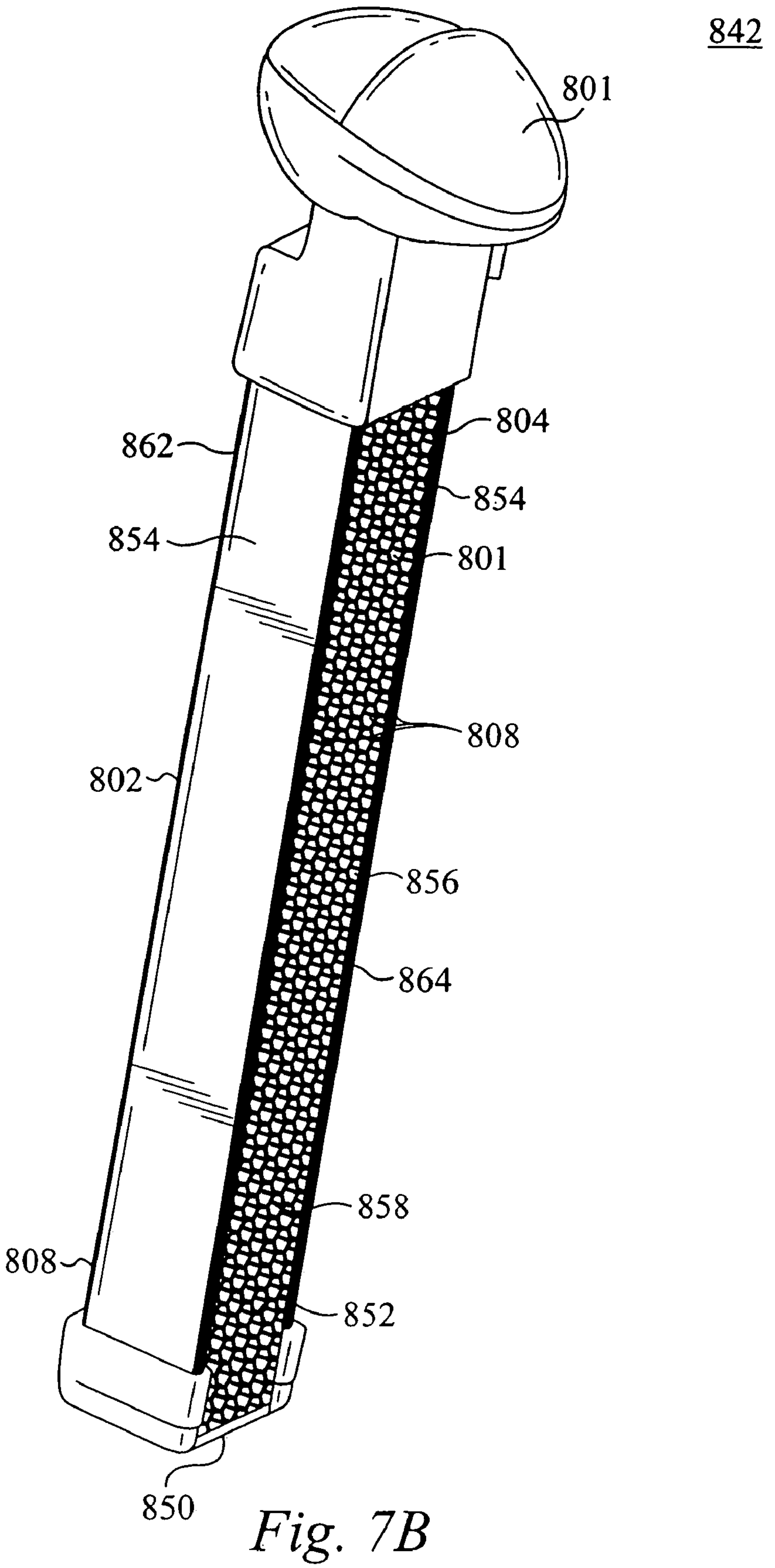
FIG. 7B illustrates a perspective view of an alternative partially insulated collecting electrode grid in accordance with one embodiment of the present invention.

In an alternative embodiment, as shown in FIG. 7B, the collector electrode 842 is modified to include a grid 852 positioned between two adjacent thin collector electrode blades 854. The grid 852 includes several honeycomb-shaped air passages 856, as discussed above. In the embodiment shown in FIG. 7B, the front edge 802 and the rear edge 804 of the collector electrode blades 854 are coated with the dielectric insulating material 808 to prevent ions from being produced at the edges 802, 804 when the electrode 852 is charged. In addition, the front edge 801 and rear edge of the grid 852 are coated with the dielectric insulating material 808 to prevent ions from forming at the edges of the conductive sheets as stated above. Alternatively, only the front edge of the collector electrode blades and the grid are coated with an insulating material. Further details regarding the embodiment in FIG. 7B are described in U.S. Provisional Application No. 60/646,876, which is incorporated by reference.

Figure 8A:
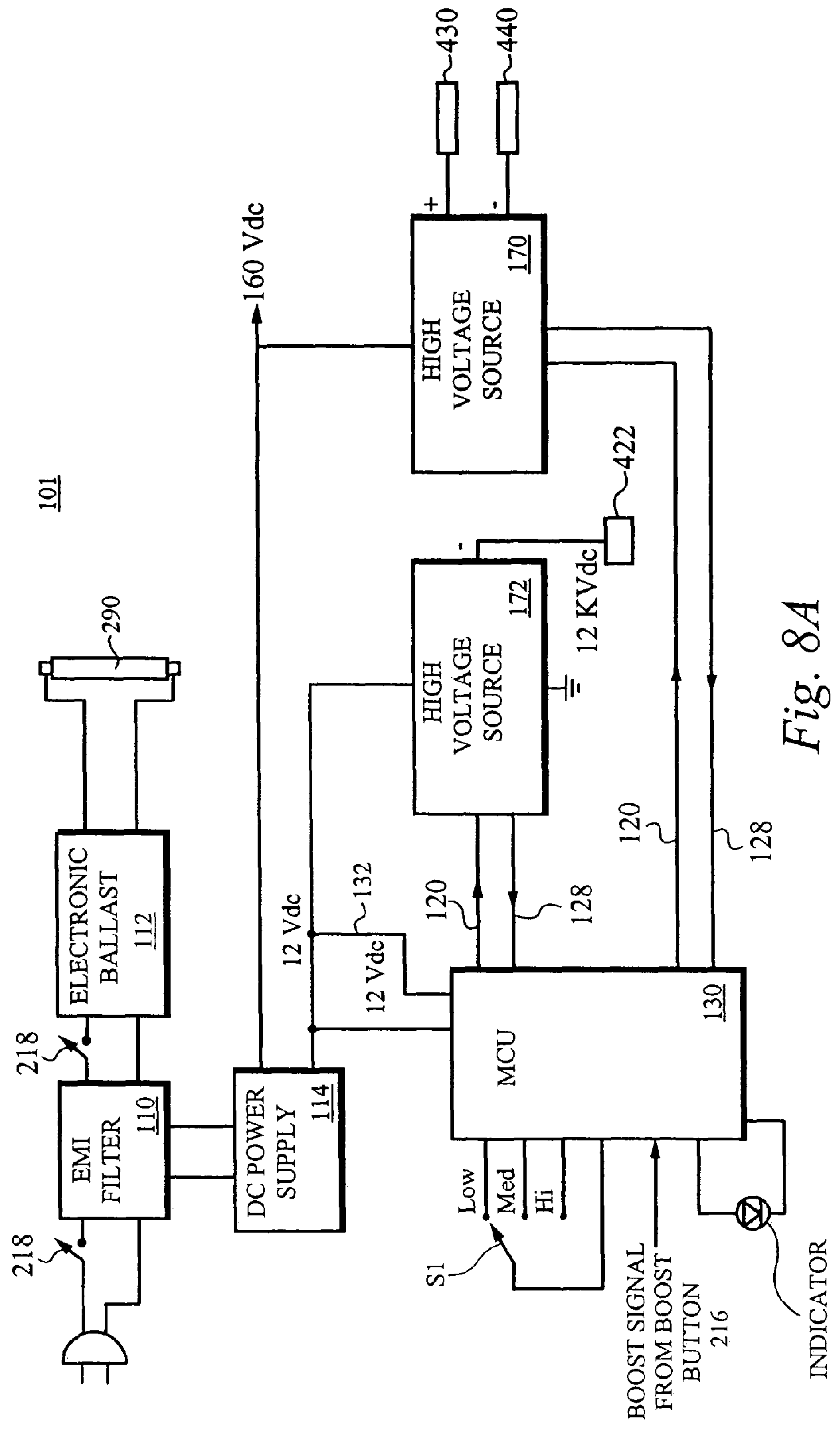
FIG. 8A illustrates an electrical block diagram of the high voltage power source of one embodiment of the present invention.

FIG. 8A illustrates an electrical circuit diagram 101 of the system 100, according to one embodiment of the present invention. The system 100 has an electrical power cord that plugs into a common electrical wall socket that provides a nominal 110 VAC. An electromagnetic interference (EMI) filter 110 is placed across the incoming nominal 110 VAC line to reduce and/or eliminate high frequencies generated by the various circuits within the system 100, such as the electronic ballast 112. In one embodiment, the electronic ballast 112 is electrically connected to the germicidal lamp 290 (FIG. 5) to regulate, or control, the flow of current through the lamp 290. A switch 218 is used to turn the lamp 290 on or off. The EMI Filter 110 is well known in the art and does not require a further description. In another embodiment, the system 100 does not include the germicidal lamp 290, whereby the circuit diagram shown in FIG. 8A would not include the electronic ballast 112, the germicidal lamp 290, nor the switch 218 used to operate the germicidal lamp 290.

The EMI filter 110 is coupled to a DC power supply 114. The DC power supply 114 is preferably coupled to the first high voltage source (HVS) 170 as well as the second HVS 172. The high voltage power source can also be referred to as a pulse generator. The DC power supply 114 is also coupled to the micro-controller unit (MCU) 130. The MCU 130 can be, for example, a Motorola 68HC908 series micro-controller, available from Motorola. Alternatively, any other type of MCU is contemplated. The MCU 130 can receive a signal from the switch S1 as well as a boost signal from the boost button 216. The MCU 130 also includes an indicator light 219 which specifies when the electrode assembly 320 is ready to be cleaned.

The DC Power Supply 114 is designed to receive the incoming nominal 110 VAC and to output a first DC voltage (e.g., 160 VDC) to the HVS 170. The DC Power Supply 114 voltage (e.g., 160 VDC) is also stepped down to a second DC voltage (e.g., 12 VDC) for powering the micro-controller unit (MCU) 130, the HVS 172, and other internal logic of the system 100. The voltage is stepped down preferably through a resistor network, transformer or other component.

As shown in FIG. 8A, the first HVS 170 is coupled to the first electrode set 430 and the second electrode set 440 to provide a potential difference between the electrode sets. It is preferred that the first electrode set 430 includes the emitter electrodes 332. It is preferred that the second electrode set 440 includes the collector electrode 442 and driver electrodes 446. As stated above, the driver electrodes 446 are not included in the set 440. In addition, the first HVS 170 is coupled to the MCU 130, whereby the MCU receives arc sensing signals 128 from the first HVS 170 and provides low voltage pulses 120 to the first HVS 170. Also shown in FIG. 8A, the second HVS 172 is coupled to the trailing electrode 322 to provide a voltage to the electrodes 322. In another embodiment, the device 100 does not include trailing electrodes 322, and the HVS 172 is not utilized or energizes another component. In addition, the second HVS 172 is coupled to the MCU 130, whereby the MCU receives arc sensing signals 128 from the second HVS 172 and provides low voltage pulses 120 to the second HVS 172.

In accordance with one embodiment of the present invention, the MCU 130 monitors the stepped down voltage (e.g., about 12 VDC), which is referred to as the AC voltage sense signal 132 in FIG. 8A, to determine if the AC line voltage is above or below the nominal 110 VAC, and to sense changes in the AC line voltage. For example, if a nominal 110 VAC increases by 10% to 121 VAC, then the stepped down DC voltage will also increase by 10%. The MCU 130 can sense this increase and then reduce the pulse width, duty cycle and/or frequency of the low voltage pulses to maintain the output power (provided to the HVS 170) to be the same as when the line voltage is at 110 VAC. Conversely, when the line voltage drops, the MCU 130 can sense this decrease and appropriately increase the pulse width, duty cycle and/or frequency of the low voltage pulses to maintain a constant output power. Such voltage adjustment features of the present invention also enable the same system 100 to be used in different countries that have different nominal voltages than in the United States (e.g., in Japan the nominal AC voltage is 100 VAC).

Figure 8B:
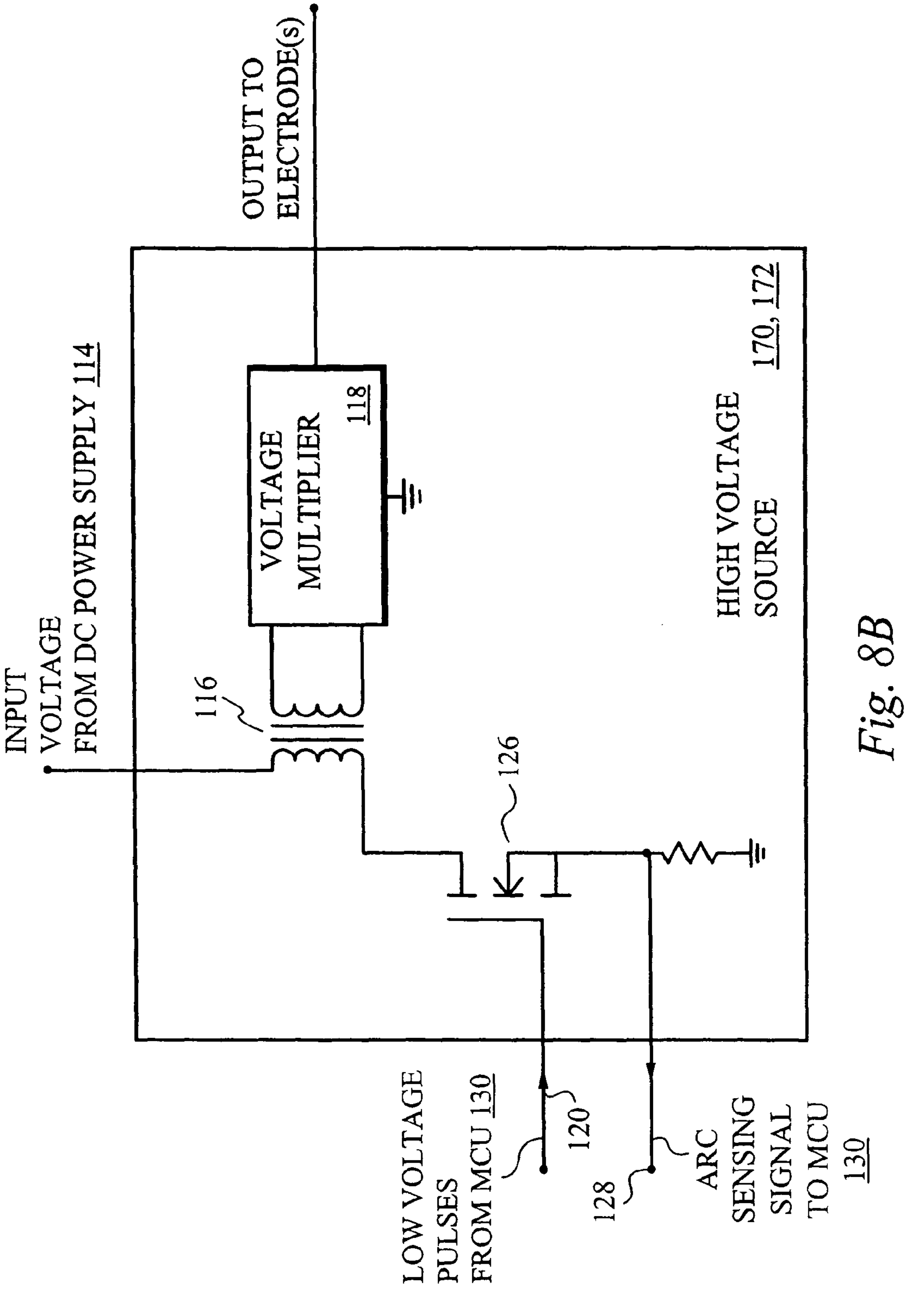
FIG. 8B illustrates an electrical block diagram of the high voltage power source in accordance with one embodiment of the present invention.

FIG. 8B illustrates a schematic block diagram of the high voltage power supply in accordance with one embodiment of the present invention. For the present description, the first and second HVSs 170, 172 include the same or similar components as that shown in FIG. 8B. However, it is apparent to one skilled in the art that the first and second HVSs 170, 172 are alternatively comprised of different components from each other as well as those shown in FIG. 8B. The various circuits and components comprising the first and second HVS 170, 172 can, for example, be fabricated on a printed circuit board mounted within the housing 102. The MCU 130 can be located on the same circuit board or a different circuit board from the remaining components.

In the embodiment shown in FIG. 8B, the HVSs 170, 172 preferably include an electronic switch 126, a step-up transformer 116 and a voltage multiplier 118. The primary side of the step-up transformer 116 receives the DC voltage from the DC power supply 114. For the first HVS 170, the DC voltage received from the DC power supply 114 is approximately 160 Vdc. For the second HVS 172, the DC voltage received from the DC power supply 114 is approximately 12 Vdc. An electronic switch 126 receives low voltage pulses 120 (of perhaps 20-25 KHz frequency) from the MCU 130. Such a switch is shown as an insulated gate bipolar transistor (IGBT) 126. The IGBT 126, or other appropriate switch, couples the low voltage pulses 120 from the MCU 130 to the input winding of the step-up transformer 116. The secondary winding of the transformer 116 is coupled to the voltage multiplier 118, which outputs the high voltage pulses to the electrode(s). For the first HVS 170, the electrode(s) can be the emitter, driver and collector electrodes. For the second HVS 172, the electrode(s) are the trailing electrodes 322. In general, the IGBT 126 operates as an electronic on/off switch. Such a transistor is well known in the art and does not require a further description.

When driven, the first and second HVSs 170, 172 receive the low input DC voltage from the DC power supply 114 and the low voltage pulses from the MCU 130 and generate high voltage pulses of preferably at least 5 KV peak-to-peak with a repetition rate of about 20 to 25 KHz. The voltage multiplier 118 in the first HVS 170 outputs between 5 to 9 KV to the first set of electrodes 230 and between −6 to −18 KV to the second set of electrodes 440. In the preferred embodiment, the emitter electrodes 432 receive approximately 5 to 6 KV whereas the collector electrodes 442 receive approximately −9 to −10 KV. The voltage multiplier 118 in the second HVS 172 outputs approximately −12 KV to the trailing electrodes 422. In one embodiment, the driver electrodes 446 are connected to ground. It is within the scope of the present invention for the voltage multiplier 118 to produce greater or smaller voltages. The high voltage pulses preferably have a duty cycle of about 10%-15%, but may have other duty cycles, including a 100% duty cycle.

The MCU 130 is coupled to a control dial S1, as discussed above, which can be set to a LOW, MEDIUM or HIGH airflow setting as shown in FIG. 8A. The MCU 130 controls the amplitude, pulse width, duty cycle and/or frequency of the low voltage pulse signal to control the airflow output of the system 100, based on the setting of the control dial S1. To increase the airflow output, the MCU 130 can be set to increase the amplitude, pulse width, frequency and/or duty cycle. Conversely, to decrease the airflow output rate, the MCU 130 is able to reduce the amplitude, pulse width, frequency and/or duty cycle. In accordance with one embodiment, the low voltage pulse signal 120 has a fixed pulse width, frequency and duty cycle for the LOW setting, another fixed pulse width, frequency and duty cycle for the MEDIUM setting, and a further fixed pulse width, frequency and duty cycle for the HIGH setting.

In accordance with one embodiment of the present invention, the low voltage pulse signal 120 preferably modulates between a predetermined duration of a "high" airflow signal and a "low" airflow signal. It is preferred that the low voltage signal modulates between a predetermined amount of time when the airflow is to be at the greater "high" flow rate, followed by another predetermined amount of time in which the airflow is to be at the lesser "low" flow rate. This is preferably executed by adjusting the voltages provided by the first HVS to the first and second sets of electrodes for the greater flow rate period and the lesser flow rate period. This produces an acceptable airflow output while limiting the ozone production to acceptable levels, regardless of whether the control dial S1 is set to HIGH, MEDIUM or LOW. For example, the "high" airflow signal can have a pulse width of 5 microseconds and a period of 40 microseconds (i.e., a 12.5% duty cycle), and the "low" airflow signal can have a pulse width of 4 microseconds and a period of 40 microseconds (i.e., a 10% duty cycle).

In general, the voltage difference between the first set 430 and the second set 440 is proportional to the actual airflow output rate of the system 100. Thus, the greater voltage differential is created between the first and second set electrodes 430, 440 by the "high" airflow signal, whereas the lesser voltage differential is created between the first and second set electrode sets 430, 440 by the "low" airflow signal. In one embodiment, the airflow signal causes the voltage multiplier 118 to provide between 5 and 9 KV to the first set electrodes 430 and between −9 and −10 KV to the second set electrodes 440. For example, the "high" airflow signal causes the voltage multiplier 118 to provide approximately 5.9 KV to the emitter electrodes and approximately −9.8 KV to the collector electrodes. In the example, the "low" airflow signal causes the voltage multiplier 118 to provide approximately 5.3 KV to the emitter electrodes and approximately −9.5 KV to the collector electrodes 440. It is within the scope of the present invention for the MCU 130 and the first HVS 170 to produce voltage potential differentials between the emitter and collector electrodes 430 and 440 other than the values provided above and is in no way limited by the values specified.

In accordance with the preferred embodiment of the present invention, when the control dial S1 is set to HIGH, the electrical signal output from the MCU 130 will continuously drive the first HVS 170 and the airflow, whereby the electrical signal output modulates between the "high" and "low" airflow signals stated above (e.g. 2 seconds "high" and 10 seconds "low"). When the control dial S1 is set to MEDIUM, the electrical signal output from the MCU 130 will cyclically drive the first HVS 170 (i.e. airflow is "On") for a predetermined amount of time (e.g., 20 seconds), and then drop to a lower or zero voltage for a further predetermined amount of time (e.g., a further 20 seconds). It is to be noted that the cyclical drive when the airflow is "On" is preferably modulated between the "high" and "low" airflow signals (e.g. 2 seconds "high" and 10 seconds "low"), as stated above. When the control dial S1 is set to LOW, the signal from the MCU 130 will cyclically drive the first HVS 170 (i.e. airflow is "On") for a predetermined amount of time (e.g., 20 seconds), and then drop to a zero or a lower voltage for a longer time period (e.g., 80 seconds). Again, it is to be noted that the cyclical drive when the airflow is "On" is preferably modulated between the "high" and "low" airflow signals (e.g. 2 seconds "high" and 10 seconds "low"), as stated above. It is within the scope and spirit of the present invention the HIGH, MEDIUM, and LOW settings will drive the first HVS 170 for longer or shorter periods of time. It is also contemplated that the cyclic drive between "high" and "low" airflow signals are durations and voltages other than that described herein.

Cyclically driving airflow through the system 100 for a period of time, followed by little or no airflow for another period of time (i.e. MEDIUM and LOW settings) allows the overall airflow rate through the system 100 to be slower than when the dial S1 is set to HIGH. In addition, cyclical driving reduces the amount of ozone emitted by the system since little or no ions are produced during the period in which lesser or no airflow is being output by the system. Further, the duration in which little or no airflow is driven through the system 100 provides the air already inside the system a longer dwell time, thereby increasing particle collection efficiency. In one embodiment, the long dwell time allows air to be exposed to a germicidal lamp, if present.

Regarding the second HVS 172, approximately 12 volts DC is applied to the second HVS 172 from the DC Power Supply 114. The second HVS 172 provides a negative charge (e.g. −12 KV) to one or more trailing electrodes 322 in one embodiment. However, it is contemplated that the second HVS 172 provides a voltage in the range of, and including, −10 KV to −60 KV in other embodiments. In one embodiment, other voltages produced by the second HVS 172 are contemplated. In one embodiment, the second HVS 172 is controllable independently from the first HVS 170 (as for example by the boost button 216) to allow the user to variably increase or decrease the amount of negative ions output by the trailing electrodes 322 without correspondingly increasing or decreasing the amount of voltage provided to the first and second set of electrodes 430, 440. More details regarding the circuit are discussed in U.S. patent application Ser. No. 11/003,671, which is incorporated by reference and has been abandoned.

The MCU 130 provides various timing and maintenance features in one embodiment. For example, the MCU 130 can provide a cleaning reminder feature (e.g., a 2 week timing feature) that provides a reminder to clean the system 100 (e.g., by causing indicator light 219 to turn on amber, and/or by triggering an audible alarm that produces a buzzing or beeping noise). The MCU 130 can also provide arc sensing, suppression and indicator features, as well as the ability to shut down the first HVS 170 in the case of continued arcing. Details regarding arc sensing, suppression and indicator features are described in U.S. Pat. No. 6,984,987, which is incorporated by reference.

The foregoing description of the above embodiments of the present invention has been provided for the purposes of illustration and description. It is not intended to be exhaustive or to limit the invention to the precise forms disclosed. Many modifications and variations will be apparent to one of ordinary skill in the relevant arts. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the claims and their equivalence.

What is claimed is:

1. An air conditioner device comprising:

an ion generator adapted to create at least ions in an airflow in a downstream direction from an inlet to an outlet, the ion generator having a collector electrode comprising a plurality of elongated flat sheet blades each blade having insulation material disposed at least on an inlet-facing edge thereof.

2. The device of claim 1 wherein the collector electrode includes a front edge and a rear edge capable of forming ions therefrom when charged, wherein insulating material is disposed on at least one of the front and rear edge.

3. The device of claim 1 wherein the ion generator further comprises an emitter electrode that is one of (1) downstream and (2) upstream of the front edge of the collector electrode.

4. The device of claim 1 further comprising one or more driver electrodes located adjacent to the collector electrode.

5. The device of claim 4 wherein one or more driver electrodes are located interstitially between the collector blades.

6. The device of claim 5 wherein the one or more driver electrodes have insulating material disposed thereon.

7. The device of claim 1 wherein the collector electrode includes a plurality of collector blades and a grid configuration therebetween having a plurality of air passageway cells.

8. An air conditioner comprising:

an emitter electrode; and a collector electrode comprising a plurality of elongated flat sheet blades, each blade having a front edge located adjacent to the emitter electrode, the collector electrode having insulating material disposed on the front edge.

9. The device of claim 8 wherein the collector electrode further comprises a rear edge, wherein insulating material is disposed on the rear edge.

10. The device of claim 8 wherein the emitter electrode is one of (1) downstream and (2) upstream of a front edge of the collector electrode.

11. The device of claim 8 further comprising one or more driver electrodes located adjacent to the collector electrode.

12. The device of claim 11 wherein one or more driver electrodes are located interstitially between the collector blades.

13. The device of claim 12 wherein the one or more driver electrodes have insulating material disposed thereon.

14. The device of claim 8 wherein the collector electrode includes a plurality of collector blades and a grid configuration therebetween having a plurality of air passageway cells.

15. An air conditioner comprising:

an emitter electrode;

a collector electrode comprising a plurality of elongated flat sheet blades, each blade having a front edge located adjacent to the emitter electrode, the collector electrode having an insulating material disposed on the front edge, wherein the insulating material prevents ions from forming on said insulated edge; and a driver electrode located adjacent to the collector electrode.

16. The device of claim 15 wherein the emitter electrode is positioned one of (1) downstream and (2) upstream of the front edge of the collector electrode.

17. The device of claim 15 wherein the driver electrode includes a plurality of electrodes located interstitially between the collector blades.

18. The device of claim 17 wherein a plurality of driver electrodes have insulating material disposed thereon.

19. The device of claim 15 further comprising a trailing electrode located downstream from the collector electrode for generating negative ions.

20. The device of claim 15 wherein the collector electrode includes a plurality of collector blades and a grid configuration therebetween having a plurality of air passageway cells.

* * * * *